United States Patent
Menner et al.

(10) Patent No.: US 12,353,176 B2
(45) Date of Patent: Jul. 8, 2025

(54) SYSTEM AND METHOD FOR CONTROLLING AN OPERATION OF A DEVICE

(71) Applicant: Mitsubishi Electric Research Laboratories, Inc., Cambridge, MA (US)

(72) Inventors: Marcel Menner, Arlington, MA (US); Stefano Di Cairano, Newton, MA (US); Karl Berntorp, Newton, MA (US); Ankush Chakrabarty, Bedford, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 400 days.

(21) Appl. No.: 17/819,557

(22) Filed: Aug. 12, 2022

(65) Prior Publication Data
US 2024/0069508 A1    Feb. 29, 2024

(51) Int. Cl.
*G05B 13/04*    (2006.01)
*G05B 6/02*    (2006.01)

(52) U.S. Cl.
CPC .......... *G05B 13/048* (2013.01); *G05B 6/02* (2013.01); *G05B 13/041* (2013.01)

(58) Field of Classification Search
CPC ...... G05B 13/048; G05B 6/02; G05B 13/041; G05B 2219/41146; G05B 2219/42061
See application file for complete search history.

(56) References Cited

U.S. PATENT DOCUMENTS

| | | | |
|---|---|---|---|
| 2012/0022384 A1* | 1/2012 | Teixeira | A61B 5/7203 |
| | | | 600/509 |
| 2022/0155802 A1* | 5/2022 | Shvalb | G05D 1/104 |
| 2023/0105304 A1* | 4/2023 | Mandal | G06F 18/2415 |
| | | | 714/37 |

OTHER PUBLICATIONS

Merwe et al., The unscented Kalman filter for nonlinear estimation. Proceedings of the IEEE 2000 Adaptive Systems for Signal Processing, Communications, and Control Symposium (Cat. No. 00EX373), Oct. 4, 2000, pp. 153-158, [online], [retrieved on Nov. 25, 2024]. Retrieved from the Internet. (Year: 2000).*

* cited by examiner

*Primary Examiner* — Kamini S Shah
*Assistant Examiner* — Mohammed Shafayet
(74) *Attorney, Agent, or Firm* — Gene Vinokur

(57) ABSTRACT

The present disclosure provides a feedback controller and method for controlling an operation of a device at different control steps. The feedback controller comprises at least one processor, and the memory having instructions stored thereon that, when executed by the at least one processor, causes the feedback controller, for a control step, to collect a measurement indicative of a state of the device at the control step, and execute, recursively until a termination condition is met, a probabilistic solver parameterized on a control input to an actuator operating the device to produce a control input for the control step. The feedback controller is further configured to control the actuator operating the device based on the produced control input.

20 Claims, 11 Drawing Sheets

$$\theta = w_1\theta_1 + w_2\theta_2 + w_3\theta_3$$

FIG. 4B

| Examples for Objectives in Cost Function | | |
|---|---|---|
| 910 | Cost for deviation of state from target state | 915 | Cost for deviation of input from reference input |
| 920 | Cost for state exceeding a certain region of operation | 925 | Cost for input exceeding a certain region of operation |
| 930 | Cost for oscillations of one or more states | 935 | Cost for oscillations of one or more inputs |
| 940 | Cost if target state is overshot by a certain value | 945 | Cost for input exceeding a certain region of operation for a certain time |
| 950 | Cost for changing states | 955 | Cost for changing inputs |
| 960 | Cost if states change quicker than a certain value | 965 | Cost if inputs change quicker than a certain value |

FIG. 9

SYSTEM AND METHOD FOR CONTROLLING AN OPERATION OF A DEVICE

TECHNICAL FIELD

The present disclosure relates generally to control systems, and more particularly to a system and a method for controlling an operation of a device at different control steps based on a feedback signal.

BACKGROUND

Optimal control deals with finding a control for a dynamical system over a period of time such that an objective function is optimized. It has numerous applications in science, engineering, and operations research. For example, the dynamical system may be a spacecraft with controls corresponding to rocket thrusters, and an objective might be to reach the moon with minimum fuel expenditure. Similarly, the dynamical system can be a vehicle with controls corresponding to an acceleration of the vehicle. Model-based control approaches, such as linear quadratic regulator (LQR) or model predictive control (MPC), use a mathematical model of a dynamical system to determine actuator commands/inputs. For numerical reasons, such a dynamical system model is simplified to facilitate numerical optimization, i.e., it is a "control-oriented" model. Such control-oriented models are chosen to be analytical functions that are linear/nonlinear and continuous, and, thus, are suited for gradient-based optimization.

As control applications become increasingly complex and computational resources become more powerful, the interest in and capabilities of more advanced controllers are increasing to cope with complex behaviors. For example, accurately controlling a dynamical system may require consideration of behaviors that are difficult to model analytically as an explicit function. Such behaviors include contact dynamics, friction, an inertia of complex shapes, flexible bodies as in soft robotics, implicit differential equations, etc. Formulation of an optimal control problem that considers complex dynamics poses a number of computational challenges that are difficult to address in real-time control application. For example, dynamic programming used to find an optimal solution to the optimal control problem may fail when the model of dynamic includes discontinuous functions.

Hence, there is a need for a system and a method for solving the optimal control problems suitable to control systems with complex dynamics.

SUMMARY

It is an object of some embodiments to provide a system and a method suitable for feedback control of systems with complex dynamics. Additionally or alternatively, it is an object of some embodiments to provide feedback control for a system/device with dynamics having an unknown analytical form. Examples of such devices include legged robots, robots or systems made partly with compliant materials instead of rigid links, electric motors, and the like. Indeed, friction in operations of many robotics systems may be difficult to capture with an analytical form.

Some embodiments are based on understanding that to achieve such an objective there is a need for an alternative approach for solving optimal control problems different from searching for an analytical solution and/or an iterative optimization, e.g., different from gradient-based optimization.

An example of such an alternative approach for solving complex optimization problems is based on principles of training deep neural networks (DNNs) starting in a new technical area of physics-informed neural networks (PINNs). DNNs are trained by minimizing a loss function to build a model based on training data, in order to make predictions or decisions without being explicitly programmed to do so. Hence, the utilization of the DNNs is commonly partitioned into two stages, i.e., a training stage for learning parameters of the DNNs and a testing stage for employing the trained DNNs to make a decision. As such, an output produced by the DNNs during the training stage is typically ignored, because the output is used only to train the parameters of the DNNs.

However, training a DNN to minimize a loss function can be contemplated as finding a solution to the loss function, or, specifically, as finding parameters of the DNN that force the trained DNN to output a solution of the loss function given an input. Some embodiments are based on understanding that the loss function can be formulated as an optimal control problem. In this regard, training a neural network using the loss function can be contemplated as equivalent to solving the optimal control problem. For example, the outputs of the trained neural network can be control inputs to the controlled device for a current control step. The input to the neural network can include a feedback signal indicative of a state of the controlled device at the current control step. Hence, the neural network needs to be retrained for each control step.

However, while this example provides an alternative approach for solving the optimal control problem, formulating the optimal control problem as training DNN, sufferers from slow convergence making it less suitable for real-time control application. It is an object of some embodiments to find a different alternative approach for solving the optimal control problem.

Some embodiments are based on a recognition that the reason for the slow convergence of the DNN training posed for solving the optimal control problem is in a deterministic nature of the outputs of the DNN. While the DNNs can be interpreted as multivariate statistical models for an approximation of an unknown expectation function, an output produced by the output layer of the DNN is deterministic and finite without further modifications. In addition, another reason for the slow convergence can be found in deterministic update of the parameters of the DNN. This determinism slows down backward propagation training of the DNN that searches for parameters of the DNN producing minimization of the loss function.

Some embodiments are based on the realization that estimation of the solution of the optimal control problem and an iterative search for such a solution should be probabilistic. The probabilistic nature of the estimation of the solution and probabilistic update of the current solution can increase the convergence of the estimated solution towards the optimal solution because it allows exploring a solution space with the likely optimal solution.

To that end, it is an object of some embodiments to find a probabilistic framework that allows to search probabilistically for the control inputs for controlling the device provided by a solution of the optimal control problem. Moreover, it is an object of some embodiments to find such a probabilistic framework that probabilistically updates the current probabilistic estimation of the control inputs until a termination condition is met.

An example of such a probabilistic framework explored by various embodiments is a probabilistic solver, such as a Kalman filter. The probabilistic solver uses a series of measurements observed over time, including statistical noise and other inaccuracies, and produces estimates of unknown variables that tend to be more accurate than those based on a single measurement alone. The probabilistic solver is used to track the state of the device under control. In other words, the Kalman filter is parameterized on the state of the device under control. For example, the Kalman filter can be used to estimate a state of a vehicle from measurements of satellite signals, as in GNSS applications. In this example, the Kalman filter is parameterized on the state of the vehicle.

A framework of an operation of the probabilistic solver includes two-phases, i.e., a prediction phase and a correction phase. For the prediction phase, the probabilistic solver produces estimates of the current state variables, along with their uncertainties. To that end, the probabilistic solver employs a prediction model subject to process noise. An example of the prediction model is a motion model of the device under control, e.g., a motion model of the vehicle. Once the outcome of the next measurement (necessarily corrupted with some error, including random noise) is observed, the estimates are updated using a weighted average of the measurements, with more weight being given to measurements with greater certainty. To that end, the probabilistic solver employs a measurement model subject to measurement noise. The measurement model connects the measurement with the state estimates. For example, the measurement model can connect GNSS measurements with the state of the vehicle.

Both the process noise and the measurement noise can be represented by a probability density function (PDF) showing the likelihood of possible variations of the predicted state and/or the received measurements. The probabilistic solver is recursive and can operate in real-time, using only present input measurements and the state estimated previously and its uncertainty matrix; no additional past information is required but can also be used if desired.

Some embodiments are based on principles that the Kalman filter can provide a framework for searching for the solution of the optimal control problem in a probabilistic manner. Indeed, instead of having a Kalman filter parametrized on state variables, such as the state of the vehicle, the Kalman filter can be parametrized on the control inputs, such as values acceleration of the vehicle. Hence, the prediction model of the Kalman filter should predict values of the control inputs subject to the process noise to produce the PDF of the predicted values of the control input. An example of such a prediction model is an identity model. Another example is making such a prediction based on a control-oriented model.

The measurement model of such a modified Kalman filter parametrized on the control inputs should connect the measurements with the current estimates of the control input. Moreover, such a connection should be indicative of a mismatch between the estimated control inputs and the controlled inputs derived from measurements in the context of the solution of the optimal control problem.

Some embodiments are based on the realization that a cost function of the optimal control problem can be evaluated through simulation of the operation of the device with the predicted control inputs and current measurements of the operation of the device. For example, the simulation can be performed based on a digital twin of the device under control to estimate a metric of performance of the operation of the device with the control inputs under evaluation. Results of the simulation are evaluated with respect to a cost function and mapped in control space subject to the measurement noise. To that end, the measurement model of some embodiments connects the metric of performance of the operation of the device with the control inputs subject to the measurement noise to estimate a PDF of measured values of the control input.

Further, correction step of the Kalman filter updates the PDF of the predicted values of the control input based on the PDF of the measured values of the control input to produce the PDF of the values of the control input for subsequent iterations. In such a manner, the control inputs are iteratively estimated and updated in a probabilistic manner. The iteration is repeated multiple times until a termination condition is met for each of the control steps.

Accordingly, one embodiment discloses a feedback controller for controlling an operation of a device at different control steps based on a feedback signal including measurements indicative of a state of the device at the different control steps. The feedback controller comprises at least one processor; and the memory having instructions stored thereon that, when executed by the at least one processor, causes the feedback controller, for a control step, to: collect a measurement indicative of the state of the device at the control step; and execute, recursively until a termination condition is met, a probabilistic solver parameterized on a control input to an actuator operating the device to produce a control input for the control step, wherein, during each of the executions, the probabilistic solver is configured to estimate a probabilistic distribution function (PDF) of predicted values of the control input from a PDF of values of the control input using a prediction model; evaluate a cost function of an optimal control problem for controlling the device based on a simulation of the operation of the device with the measurement and a value of the control input sampled from the PDF of predicted values of the control input to produce a performance metric of the operation of the device; and estimate a PDF of simulated values connected to the control input based on a measurement model connecting the performance metric of the operation of the device with the control input; and correct the PDF of the predicted values of the control input based on the PDF of the simulated values connected to the control input to produce the PDF of the values of the control input. The feedback controller is further configured to control the actuator operating the device using at least a mean of the PDF of the values of control input.

Accordingly, another embodiment discloses a method for controlling an operation of a device at different control steps based on a feedback signal including measurements indicative of a state of the device at the different control steps. The method comprises collecting a measurement indicative of the state of the device at the control step and executing, recursively until a termination condition is met, a probabilistic solver parameterized on a control input to an actuator operating the device to produce a control input for the control step. During each of the executions, the probabilistic solver is configured to estimate a probabilistic distribution function (PDF) of predicted values of the control input from a PDF of values of the control input using a prediction model; evaluate a cost function of an optimal control problem for controlling the device based on at least one simulation of the operation of the device with the measurement and a value of the control input sampled from the PDF of predicted values of the control input to produce a performance metric of the operation of the device; and estimate a PDF of simulated values connected to the control input based on a measurement model connecting the performance metric of the operation of the device with the control input; and correct the PDF of the predicted values of the control input based on the PDF of the simulated values connected to the control input to produce the PDF of the values of the control input. The method further comprises controlling the actuator operating the device using at least a mean of the PDF of the values of control input.

Accordingly, yet another embodiment discloses non-transitory computer-readable storage medium embodied thereon a program executable by a processor for performing a method for controlling an operation of a device at different control steps based on a feedback signal including measurements indicative of a state of the device at the different control steps. The method comprises collecting a measurement indicative of the state of the device at the control step and executing, recursively until a termination condition is met, a probabilistic solver parameterized on a control input to an actuator operating the device to produce a control input for the control step. During each of the executions, the probabilistic solver is configured to estimate a probabilistic distribution function (PDF) of predicted values of the control input from a PDF of values of the control input using a prediction model; evaluate a cost function of an optimal control problem for controlling the device based on a simulation of the operation of the device with the measurement and a value of the control input sampled from the PDF of predicted values of the control input to produce a performance metric of the operation of the device; and estimate a PDF of simulated values connected to the control input based on a measurement model connecting the performance metric of the operation of the device with the control input; and correct the PDF of the predicted values of the control input based on the PDF of the simulated values connected to the control input to produce the PDF of the values of the control input. The method further comprises controlling the actuator operating the device using at least a mean of the PDF of the values of control input.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIGS. 4A and 4B illustrate a procedure of how distributions of the control input are used to determine simulation trials for a simulation step, according to some embodiments of the present disclosure.

FIG. 9 shows an example list of objectives of a cost function, according to some embodiments in the present disclosure.

DETAILED DESCRIPTION

Figure 1:
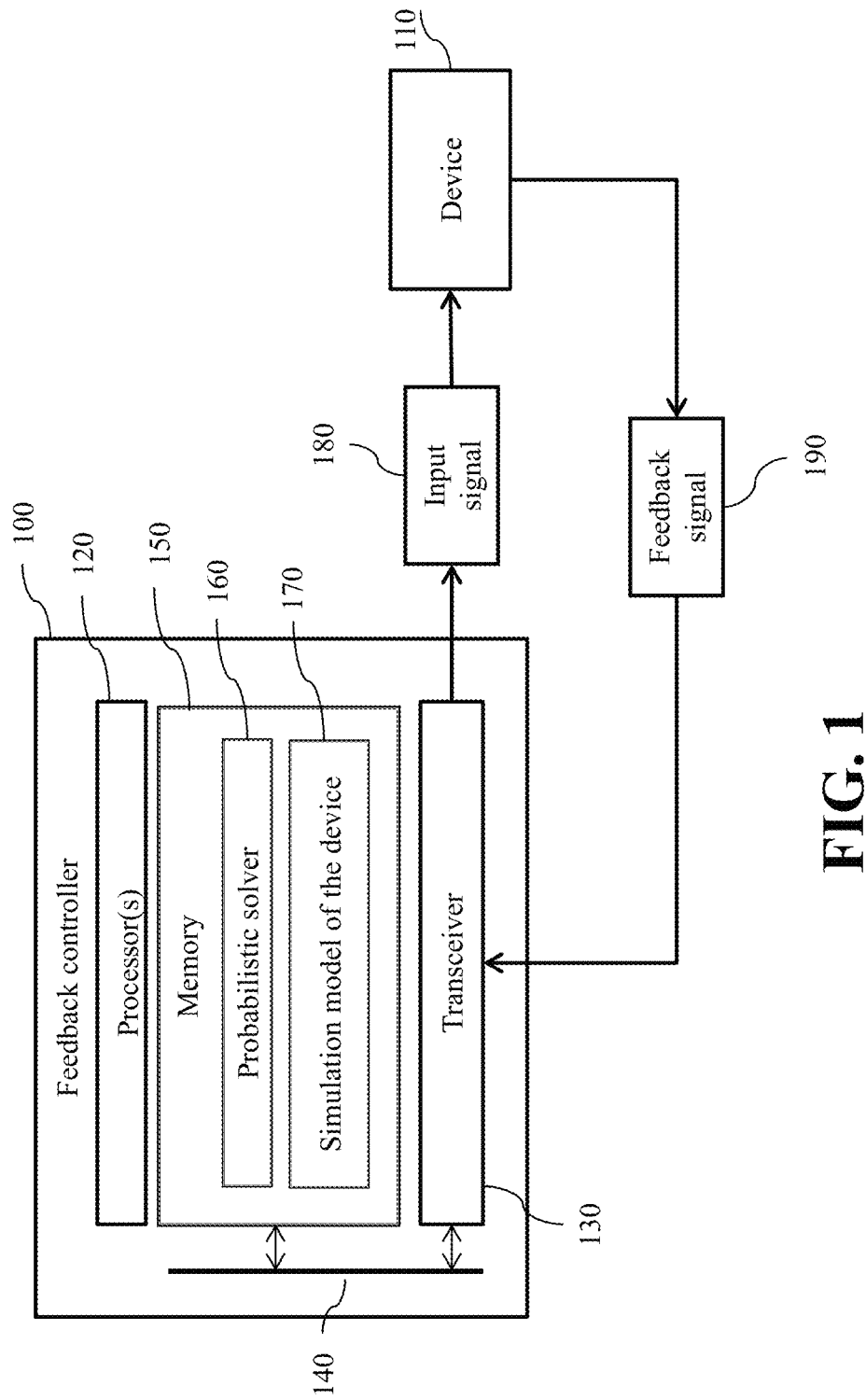
FIG. 1 illustrates a block diagram of a feedback controller for controlling an operation of a device at different control steps, according to some embodiments of the present disclosure.

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

It is an object of some embodiments to provide a system and a method suitable for feedback control of systems with complex dynamics. Additionally or alternatively, it is an object of some embodiments to provide feedback control for a system/device with dynamics having an unknown analytical form. Some embodiments are based on understanding that to achieve such an objective there is a need for an alternative approach for solving optimal control problems different from searching for an analytical solution and/or an iterative optimization, e.g., different from gradient-based optimization.

An example of such an alternative approach for solving complex optimization problems is based on principles of training deep neural networks (DNNs) starting in a new technical area of physics-informed neural networks (PINNs). DNNs are trained by minimizing a loss function to build a model based on training data, in order to make predictions or decisions without being explicitly programmed to do so. Hence, the utilization of the DNNs is commonly partitioned into two stages, i.e., a training stage for learning parameters of the DNNs and a testing stage for employing the trained DNNs to make a decision. As such, an output produced by the DNNs during the training stage is typically ignored, because the output is used only to train the parameters of the DNNs.

However, training a DNN to minimize a loss function can be contemplated as finding a solution to the loss function, or, specifically, as finding parameters of the DNN that force the trained DNN to output a solution of the loss function given an input. Some embodiments are based on understanding that the loss function can be formulated as an optimal control problem. In this regard, training a neural network using the loss function can be contemplated as equivalent to solving the optimal control problem. For example, the outputs of the trained neural network can be control inputs to the controlled device for a current control step. The input to the neural network can include a feedback signal indicative of a state of the controlled device at the current control step. Hence, the neural network needs to be retrained for each control step.

However, while this example provides an alternative approach for solving the optimal control problem, formulating the optimal control problem as training DNN, sufferers from slow convergence making it less suitable for real-time control application. It is an object of some embodiments to find a different alternative approach for solving the optimal control problem.

Some embodiments are based on a recognition that the reason for the slow convergence of the DNN training posed for solving the optimal control problem is in a deterministic nature of the outputs of the DNN. Indeed, while the DNNs can be interpreted as multivariate statistical models for an approximation of an unknown expectation function, an output produced by the output layer of the DNN is deterministic and finite without further modifications. In addition, another reason for the slow convergence can be found in deterministic update of the parameters of the DNN. This determinism slows down backward propagation training of the DNN that searches for parameters of the DNN producing minimization of the loss function.

Some embodiments are based on the realization that estimation of the solution of the optimal control problem and an iterative search for such a solution should be probabilistic. The probabilistic nature of the estimation of the solution and probabilistic update of the current solution can increase the convergence of the estimated solution towards the optimal solution because it allows exploring a solution space with the likely optimal solution.

To that end, it is an object of some embodiments to find a probabilistic framework that allows to search probabilistically for the control inputs for controlling the device provided by a solution of the optimal control problem. Moreover, it is an object of some embodiments to find such a probabilistic framework that probabilistically updates the current probabilistic estimation of the control inputs until a termination condition is met.

An example of such a probabilistic framework explored by various embodiments is a probabilistic solver, such as a Kalman filter. Some embodiments are based on the realization that the probabilistic solver can be used for controlling the device having complex dynamics. For example, based on the probabilistic solver, a feedback controller may be formulated such that the feedback controller collects a measurement indicative of the state of the device at a control step, executes the probabilistic solver to produce a control input for the control step, and controls the device based on the produced control input. Such a feedback controller based on the probabilistic solver is explained below in FIG. 1.

FIG. 1 illustrates a block diagram of a feedback controller 100 for controlling an operation of a device 110 at different control steps, according to some embodiments of the present disclosure. The feedback controller 100 may be operatively coupled to the device 110. Examples of the device 110 may include a vehicle (e.g., an autonomous vehicle), a robotic assembly, a legged robot, a motor, an elevator door, a HVAC (Heating, Ventilating, and Air-Conditioning) system, or the like. For example, the vehicle can be self-driving car, aircraft, spacecraft, dynamically positioned ships, or the like. Examples of the operation of the device 110 may include, but are not limited to, operating the vehicle according to a specific objective, operating the HVAC system according to specific parameters, operating a robot arm according to a specific task, and opening/closing elevator doors.

The feedback controller 100 may include at least one processor 120, a transceiver 130, and a bus 140. Additionally, the feedback controller 100 may include a memory 150. The memory may be embodied as a storage media such as RANI (Random Access Memory), ROM (Read Only Memory), hard disk, or any combinations thereof. For instance, the memory 150 may store instructions that are executable by the at least one processor 120. In an embodiment, the memory 150 is configured to store a probabilistic solver 160 and a simulation model 170 of the device 110. The probabilistic solver 160 is parameterized on a control input to an actuator operating the device 110. The simulation model 170 of the device 110 may approximate a physical behavior of the device 110. For example, the device 110 may be an electric motor and the simulation model 170 may be a model of the electric motor. The probabilistic solver 160 and the simulation model 170 are explained in detail at later stages. The at least one processor 120 may be embodied as a single core processor, a multi-core processor, a computing cluster, or any number of other configurations. The at least one processor 120 may be operatively connected to the memory 150 and/or the transceiver 130 via the bus 140.

According to an embodiment, the feedback controller 100 may be configured to determine a sequence of control inputs to control the device 110. For example, the control inputs may be possibly associated with physical quantities such as voltages, pressures, forces, torques, or the like. In an example embodiment, the feedback controller 100 may determine the sequence of control inputs such that the sequence of the control inputs change states of the device 110 in order to perform a specific task, e.g., tracking a reference. Once the sequence of control inputs is determined, the transceiver 130 may be configured to submit the sequence of control inputs as an input signal 180 to the device 110. As a result, the states of the device 110 may be changed according to the input signal 180 to perform the specific task. For instance, the transceiver 130 may be a RF (Radio Frequency) transceiver, or the like.

Further, the states of the device 110 may be measured using one or more sensors installed in the device 110. The one or more sensors may send a feedback signal 190 to the transceiver 130. The transceiver 130 may receive the feedback signal 190. In an example embodiment, the feedback signal 190 may include a sequence of measurements corresponding to the sequence of the control inputs respectively. For instance, the sequence of measurements may be measurements of the states outputted by the device 110 in accordance with the sequence of the control inputs. Accordingly, each measurement in the sequence of measurements may be indicative of a state of the device 110 caused by a corresponding control input. Each measurement in the sequence of measurements may be possibly associated with the physical quantities such as currents, velocities, positions, and/or the like. In this way, the feedback controller 100 may iteratively submit the sequence of control inputs and receive the feedback signals. In an example embodiment, in order to determine the sequence of control inputs for a control step, the feedback controller 100 uses the feedback signal 190 that includes the sequence of measurements indicating current states of the device 110.

In order to determine the control input for a control step, the processor 120 executes, recursively until a termination condition is met, the probabilistic solver 160 to produce a control input for the control step. In an embodiment, the probabilistic solver 160 may use the simulation model 170 of the device 110 to produce the control input for the control step. The steps executed by the probabilistic solver 160 for producing the control input is explained below in FIG. 2.

Figure 2:
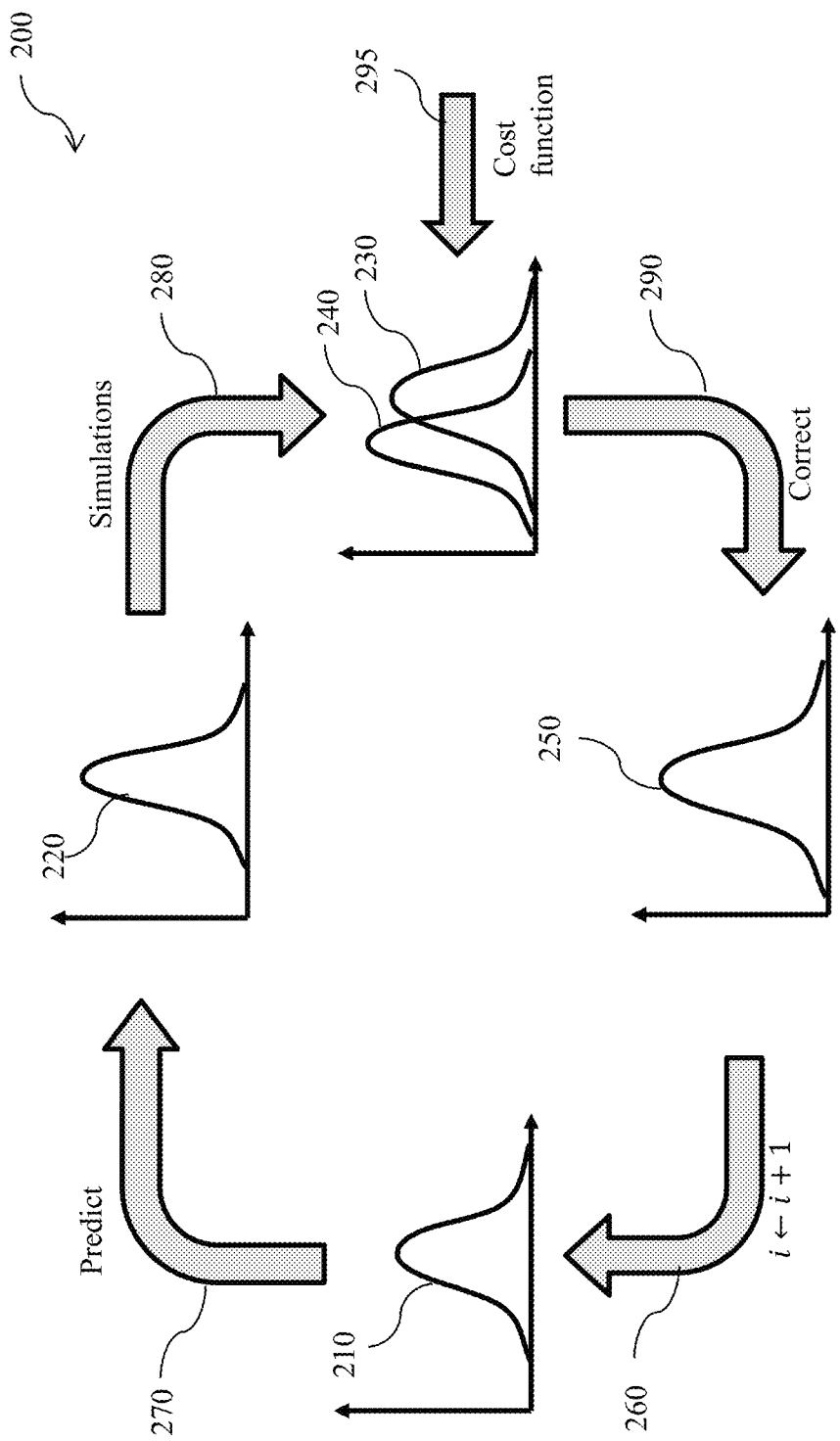
FIG. 2 shows a schematic illustrating step executed by a probabilistic solver for producing a control input, according to some embodiments of the present disclosure.

FIG. 2 shows a schematic 200 illustrating the steps executed by the probabilistic solver 160 for producing the control input, according to some embodiments of the present disclosure. The steps executed by the probabilistic solver 160 includes a prediction step 270, a simulation step 280, and/or a correction step 290.

Figure 3:
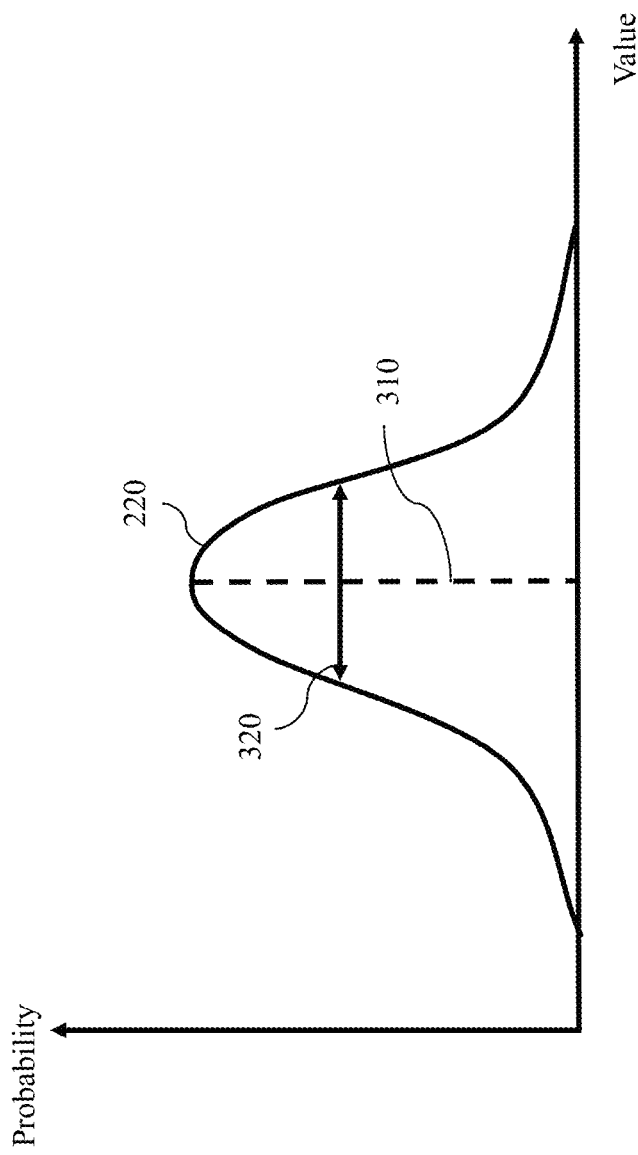
FIG. 3 illustrates an example of a probabilistic distribution function (PDF), according to some embodiments of the present disclosure.

In the prediction step 270, the probabilistic solver 160 estimates a probabilistic distribution function (PDF) 220 of predicted values of the control input from a PDF 210 of values of the control input, using a prediction model. FIG. 3 illustrates an example of the PDF 220, according to some embodiments of the present disclosure. For instance, the PDF 220 may correspond to a Gaussian distribution. The Gaussian distribution may be defined by a mean 310 and a variance 320, where the mean 310 defines a center position of the distribution 220 and the variance 320 defines a spread (or a width) of the distribution 220.

Referring back to FIG. 2, further, at least one simulation of the operation of the device 110 with the measurement indicative of the state of the device at the control step and a value of the control input sampled from the PDF 220 of predicted values of the control input is carried out, to produce a performance metric of the operation of the device 110. The probabilistic solver 160 evaluates a cost function 295 defining the performance metric of an optimal control problem based on the at least one simulation of the operation of the device 110.

Further, the probabilistic solver 160 estimates a PDF 240 of simulated values connected to the control input based on a measurement model connecting the performance metric of the operation of the device with the control input. The probabilistic solver 160 may use the PDF 240 of simulated values and the PDF 230 defining the predicted cost function 230 in order to determine a corrected PDF 250 of the predicted values of the control input, in the correction step 290. The correction step 290 is explained in detail in FIG. 6.

The prediction step 270, the simulation step 280, and the correction step 290 are recursively executed 260 until the termination condition is met. Once the termination condition is met, the probabilistic solver 160 outputs the values of the control input. The values of the control input define a control policy. In other words, values of the control input correspond to parameters of the control policy. The feedback controller 100 controls the device 110 according to the control policy. In particular, the feedback controller 100 controls the actuator operating the device, based on the values of control input.

In an embodiment, the cost function 295 may include a deviation of the states of the device 110 from state reference values, a deviation of the control inputs from input reference values, a penalty for reaching a certain target not in time, and the like. The cost function 295 may include the states of the device 110 at the current time instance provided by the current measurements. Additionally or alternatively, the cost function 295 may include predicted future states of the device 110. For instance the cost function 295 may use a squared 2-norm, $$\text{cost function} = \quad (1)$$
$$\|h_{ref} - h(x(t), u(t))\|_Q = (h_{ref} - h(x(t), u(t)))^T Q(h_{ref} - h(x(t), u(t)))$$

with x(t) may represent the predicted future states of the device 110, u(t) may represent the control policy, and Q may be a positive definite matrix.

The predicted future states of the device 110, x(t), may be obtained using the simulation model 170 and the control policy, u(t), $$0 = f_{sim}(x(t), u(t), t) \quad (2)$$

where the states of the device 110, $x_0$ may be used in order to initialize the predicted future states of the device 110 at time zero, $x(0) = x_0$.

The optimization-based procedure illustrated in FIG. 2 may be implemented in order to minimize the cost function (1) subject to constraints that define the simulation model 170 and the states of the device 110 over a certain time horizon $T_{hor}$, $$\min \quad \|h_{ref} - h(x(t), u(t))\|_Q \quad (3)$$
$$0 = f(x(t), u(t), t), \, t \in [0, T_{hor}]$$
$$\text{s.t.} \quad x(0) = x_0$$

Some embodiments use a parametrization of the control policy, i.e., the control inputs, $$u(t) = \phi(\theta, t), \quad (4)$$

with some parameters of the control policy θ. Examples of the parametrization of the control policy include a zero-order hold, $$u(t) = \phi(\theta, t) = u_k, \text{ for } k \leq t \leq k + T_s, \quad (5)$$

with $\theta = \begin{bmatrix} u_0 & u_1 & \ldots & u_{T_{hor} - T_s} \end{bmatrix}^T$, a first-order hold, $$u(t) = \phi(\theta, t) = u_{k+T_s} \frac{t}{T_s} + u_k \left(1 - \frac{t}{T_s}\right), \text{ for } k \leq t \leq k + T_s, \quad (6)$$

or an implementation that uses basis functions, $$u(t) = \phi(\theta, t) = \theta^T X(t). \quad (7)$$

In this context, the parameters of the control policy θ may define the control policy u(t), and the control policy may define the predicted future states x(t) of the device 110 by means of the simulation model 170.

The probabilistic solver 160 may update the parameters of the control policy at every iteration i. The prediction model of the prediction step 270 may be given by a gradient of the cost function (1) with respect to the parameters of the control policy θ, $$\theta_{i+1} = \theta_i + f(\theta_i) \quad (8)$$

with $\theta_i$ defining the parameters of the control policy at every iteration i and f ($\theta_i$) defining the gradient as $$f(\theta_i) = \left( s \left( \frac{\partial c(x(t), u(t), t)}{\partial x(t)} \frac{\partial x(t)}{\partial u(t)} + \frac{\partial c(x(t), u(t), t)}{\partial u(t)} \right) \frac{\partial u(t)}{\partial \theta_i} \right)_{\theta_i} \quad (9)$$

with a certain scaling in the gradient s. Advantages of using the gradient as part of the prediction model 270 include that the optimization-based procedure may converge quickly, which may improve sampling rate of the feedback controller 100.

Alternatively, the prediction model of the prediction step 270 may be given by an identity model, $$\theta_{i+1}=\theta_i. \quad (10)$$

The identity model is advantageous as no analytical model needs to be derived and no analytical model needs to be stored in the memory 150.

Figure 4A:
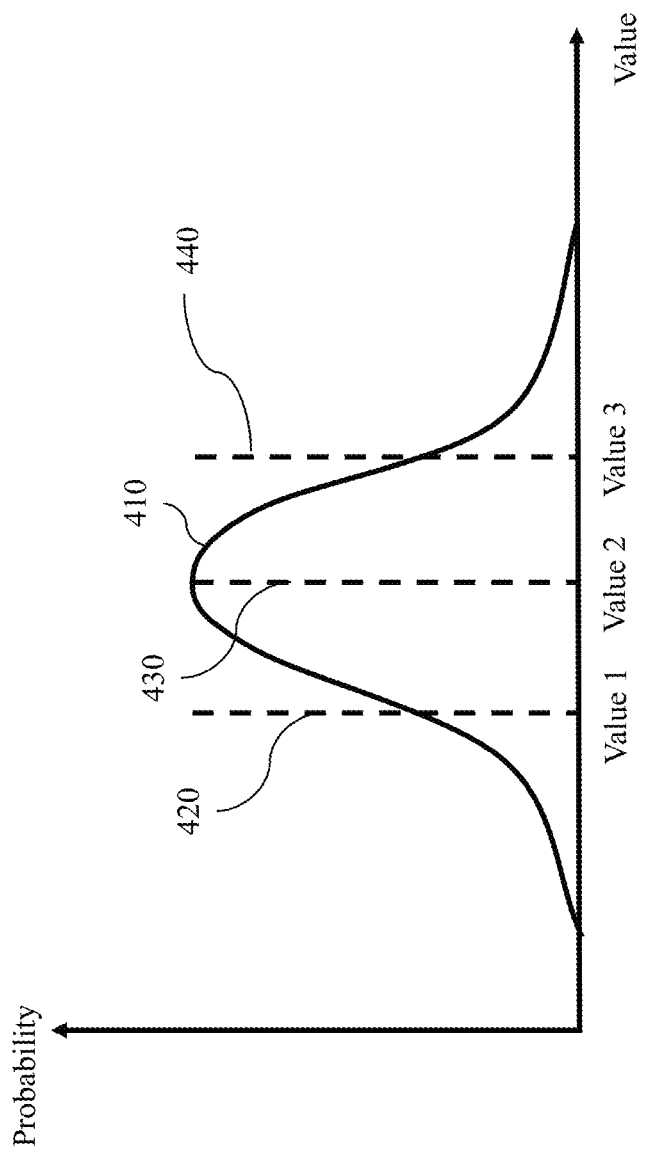
Figure 4B:
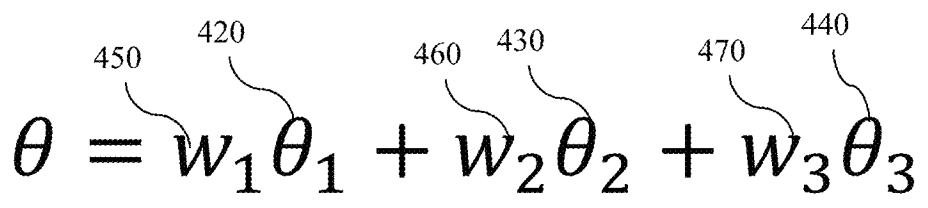

FIGS. 4A and 4B illustrate a procedure of how distributions of the control inputs are used to determine simulation trials for the simulation step 280, according to some embodiments of the present disclosure. A distribution 410 may correspond to the PDF 220. The distribution 410 may define a certain number of simulation trials. For example, the distribution 410 may provide three control policies. The three control policies may be given by a first control input 420, a second control input 430, and a third control input 440. The probabilistic solver 160 may execute the simulation step 480 and evaluate the simulations' performances using the three control inputs 420, 430, and 440. For instance, the distribution 410 may be a Gaussian distribution with a mean $\theta$ and a variance $\sigma^2$. In this example, the first control input 420 may be given by $\theta_1=\theta-\sigma^2$, the second control input 430 may be given by $\theta_2=\theta$, and the third control input 440 may be given by $\theta_3=\theta+\sigma^2$. The simulation trials may then be conducted using such three control inputs defining three control policies, $$u_1=\phi(\theta_1,t), \quad (11)$$

$$u_2=\phi(\theta_2,t), \quad (12)$$

and $$u_3=\phi(\theta_3,t). \quad (13)$$

Results of the simulation trials resulting from the three control inputs may then be used to determine the corrected PDF 250 in the correction step 290. For instance, the control inputs/parameter defining the control policy may be updated using a weighted average of the three control inputs as $$\theta=w_1\theta_1+w_2\theta_2+w_3\theta_3 \quad (14)$$

Weights $w_1$ 450, $w_2$ 460, and $w_3$ 470 are assigned to the control inputs $\theta_1$ 420, $\theta_2$ 430, and $\theta_3$ 440, respectively. The weights $w_1$ 450, $w_2$ 460, and $w_3$ 470 may be chosen according to the cost function 295, $$w_1 = \frac{c_2+c_3}{c_1+c_2+c_3}, \quad (15)$$

and $$w_2 = \frac{c_1+c_3}{c_1+c_2+c_3}, \quad (16)$$

and $$w_3 = \frac{c_1+c_2}{c_1+c_2+c_3}, \quad (17)$$

where $c_i$ is the evaluated cost function of the simulation trial associated with the parameter $\theta_i$.

Some embodiments are based on the recognition that different variances of different Gaussian distributions may yield different control inputs that are evaluated in the simulation step 280. For instance, a Gaussian distribution having a high variance may result in simulation trials with control inputs defining the control policy that are further apart than control inputs of the Gaussian distributions having a lower variance.

Figure 5:
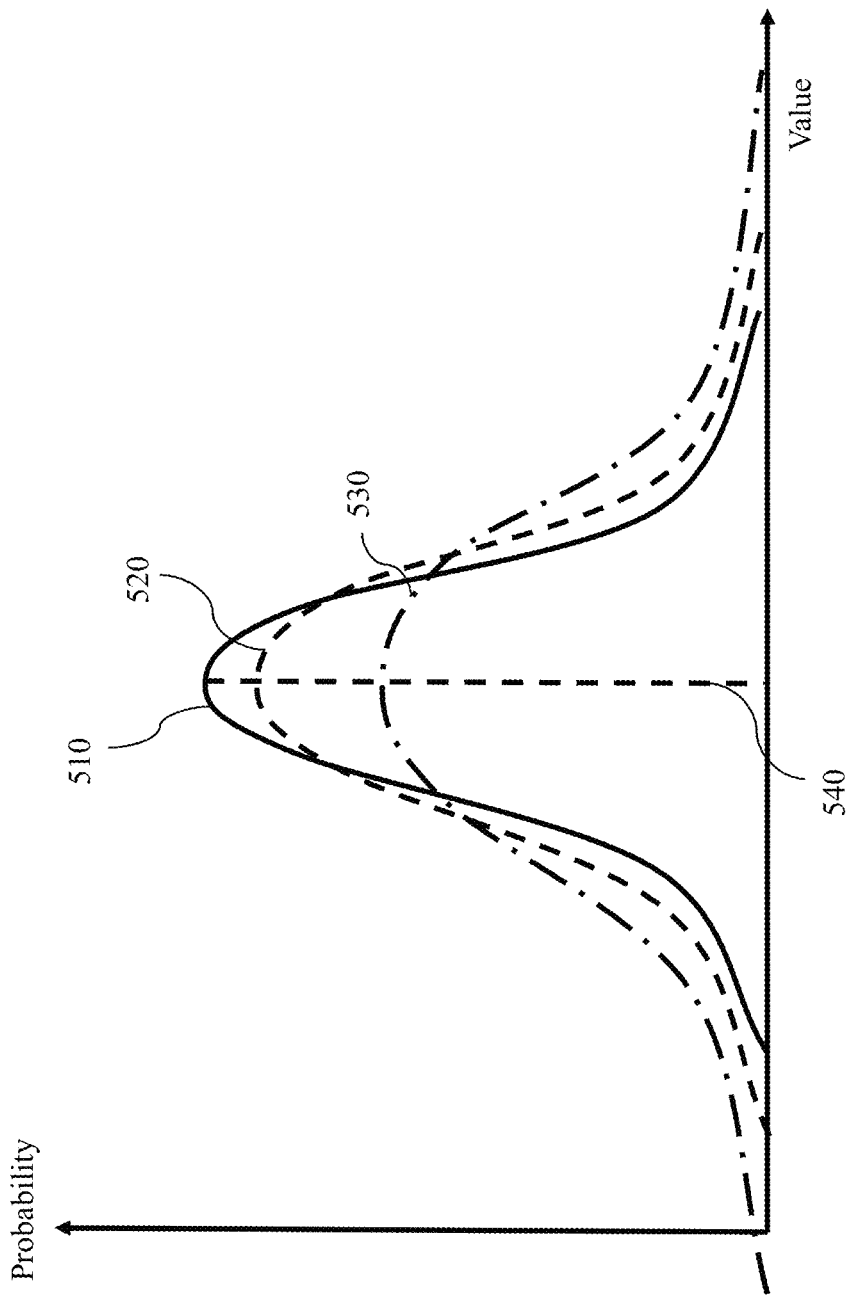
FIG. 5 illustrates Gaussian distributions with different variances, according to some embodiments of the present disclosure.

FIG. 5 illustrates Gaussian distributions 510, 520, and 530 with different variances, according to some embodiments of the present disclosure. The Gaussian distributions 510, 520, and 530 may be predicted by the prediction step 270. Each of the Gaussian distributions 510, 520, and 530 has a different variance with respect to each other, but a mean 540 of the Gaussian distributions 510, 520, and 530 may be the same. A Gaussian distribution with a small variance and the mean 540 having highest probability among other Gaussian distributions may be more certain about the correct control input defining the control policy. The different variances of the Gaussian distributions 510, 520, and 530 may yield different control inputs defining the control policy that are evaluated in the simulation step 280. For instance, the Gaussian distribution 530 having a high variance may result in the simulation trials with control inputs defining the control policy that are further apart than control inputs of the Gaussian distributions 510 having a lower variance.

Figure 6:
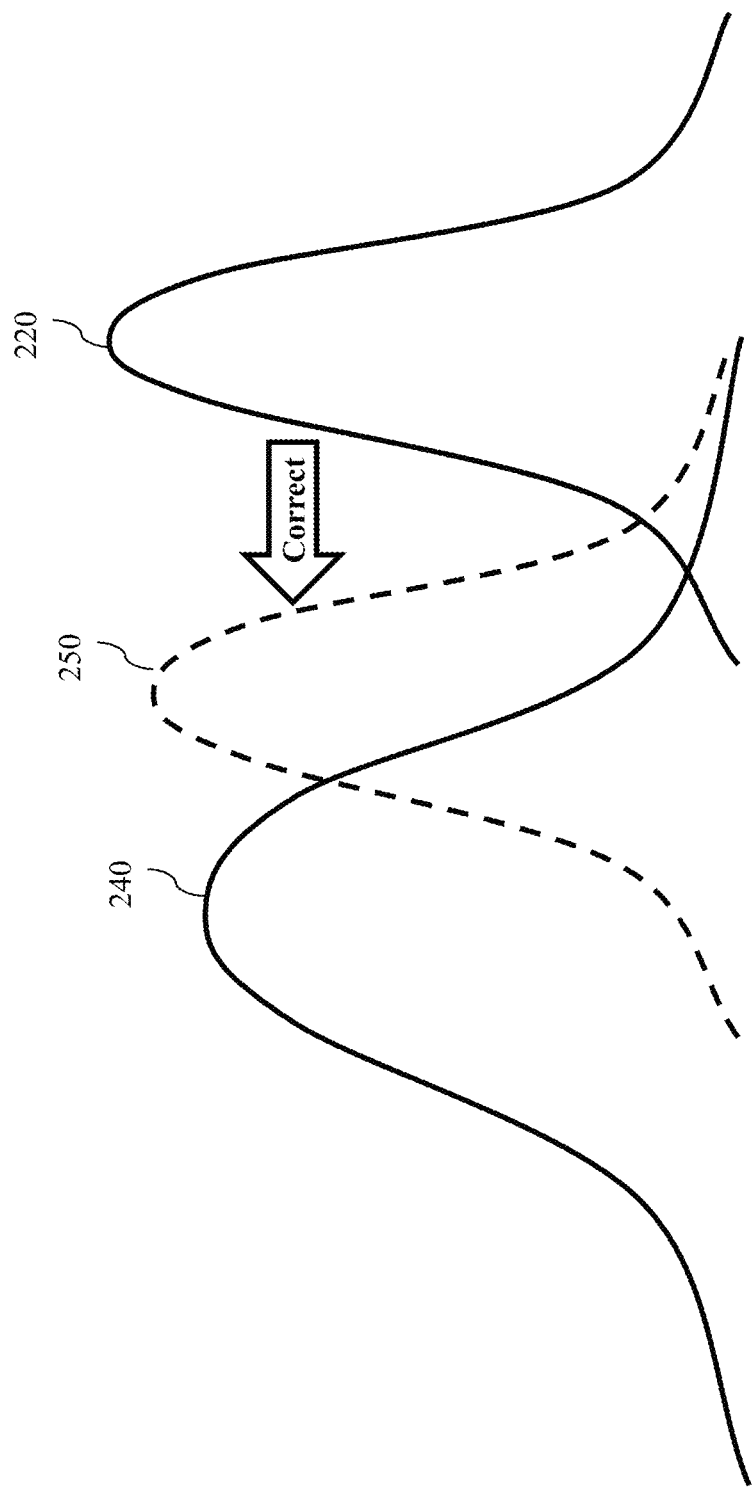
FIG. 6 shows a schematic illustrating a correction step for producing a corrected PDF, according to some embodiments of the present disclosure.

FIG. 6 shows a schematic illustrating the correction step 290 for producing the corrected PDF 250, according to some embodiments of the present disclosure. The probabilistic solver 160 corrects the PDF 220 of the predicted values of the control input based on the PDF 240 of the simulated values connected to the control input to produce the PDF 250 of the values of the control input. For instance, the three control inputs 420, 430, and 440 in FIG. 4 defining the three control policies and resulting in three predicted future states of the device 110 may be evaluated using the cost function (1). The three evaluations may be used in order to determine how to update the control inputs defining the control policies. For instance, if the evaluation of the third control input 440 yields a lower cost than the first control input 420 and yields a lower cost than the second control input 430, then the probabilistic solver 160 may determine the control input defining the control policy at the next iteration to be closer to the third control input 440.

The prediction step 270, the simulation step 280, and/or the correction step 290 are recursively executed until the termination condition is met.

Figure 7:
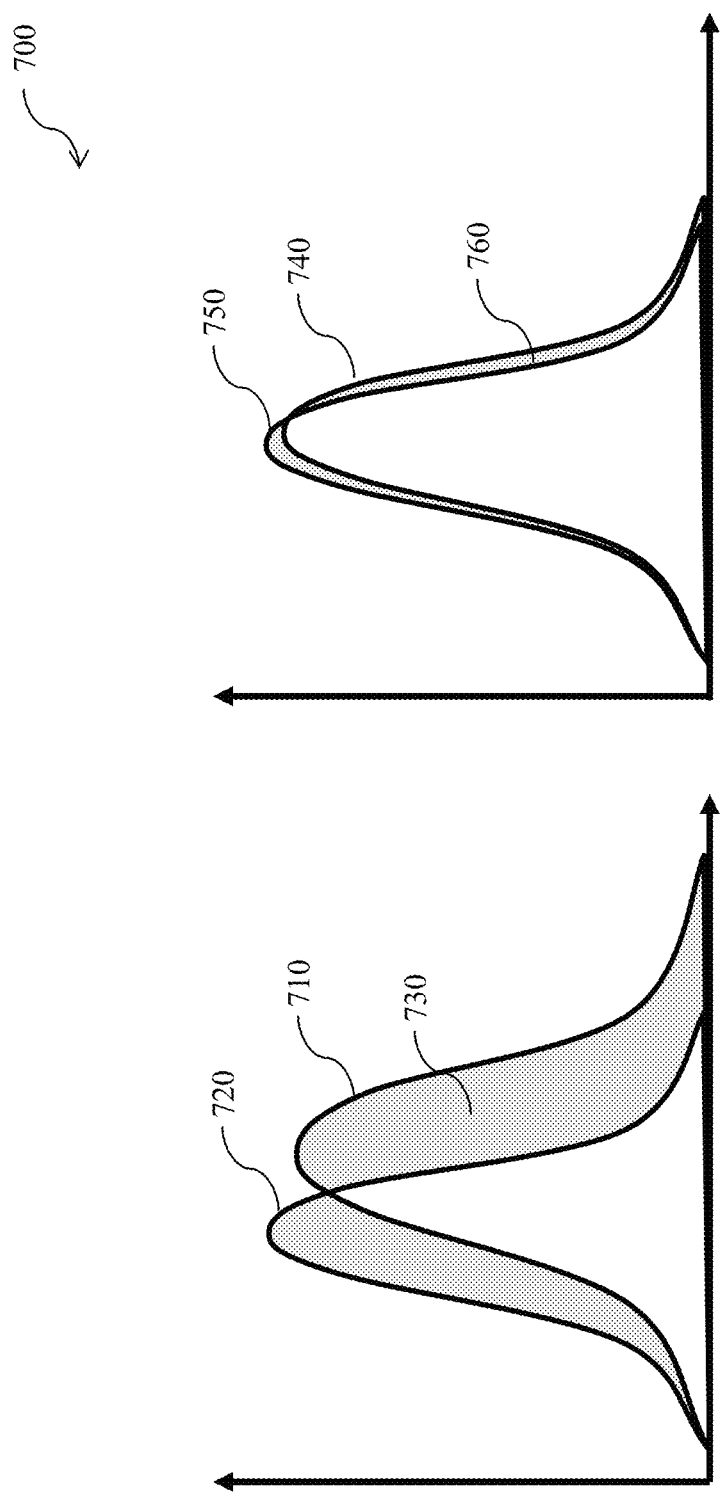
FIG. 7 illustrates an example termination condition, according to some embodiments in the present disclosure.

FIG. 7 illustrates an example termination condition, according to some embodiments in the present disclosure. FIG. 7 illustrates a first PDF 710, a second PDF 720, and a surface area 730 defining a difference between the first PDF 710 and the second PDF 720. The first PDF 710 may correspond to the PDF 230 defining the predicted cost function 230 and the second PDF 720 may correspond to the PDF 240 of simulated values. The surface area 730 may be used as a metric to determine whether to stop the iteration or continue the recursive iterations. For example, the surface area 730 may be too large to terminate the recursive iterations to end the optimization-based procedure illustrated in FIG. 2. After further iterations, the probabilistic solver 160 may produce a third PDF 740 and a fourth PDF 750. The third PDF 740 may correspond to the PDF defining the predicted cost function (e.g., PDF 230) and the fourth PDF 750 may correspond to the PDF 240 of simulated values (e.g., PDF 240). In this example, a surface area 760 between the third PDF 740 and the fourth PDF 750 may be determined to be sufficiently small to stop the recursive iterations to end the optimization-based procedure. In some alternate embodiments, the termination condition is based on a similarity metric between the PDF of values of the control input at the current iteration and a PDF of values of the control input at a previous iteration. If such a similarity is less than a threshold, then it is contemplated that the termination condition is met.

For example, the optimization-based procedure may use Kullback-Leibler divergence metric as the termination condition. For two distributions $p_{i+1}(\theta)$ and $p_i(\theta)$, the Kullback-Leibler divergence may be defined as $$\int_{-\infty}^{\infty} p_{i+1}(\theta) \log\left(\frac{p_{i+1}(\theta)}{p_i(\theta)}\right) dx. \qquad (18)$$

Alternatively, the optimization-based procedure may use a metric of closeness of the control inputs as $$\|\mathbb{E}\left[p_{i+1}(\theta)\right] - \mathbb{E}\left[p_i(\theta)\right]\|. \qquad (19)$$

Some embodiments use a Kalman filter as the probabilistic solver 160. The Kalman filter is a process (or a method) that produces estimates of unknown variables using a series of measurements observed over a time period, containing statistical noise and other inaccuracies. Indeed, these produced estimates of the unknown variables (such as the control inputs) may be more accurate than an estimate of an unknown variable produced using a single measurement. The Kalman filter produces the estimates of the unknown variables by estimating a joint probability distribution over the unknown variables. The Kalman filter is a two-step process, which includes a predicting step and an updating step. In the predicting step, the Kalman filter uses the prediction model to predict the current variables along with their uncertainties governed by a process noise. For instance, the prediction model may be designed such that the prediction model is subjected to the process noise for reducing the uncertainties in the variables, while predicting the current variables. Indeed, the predicted current variables may be represented by the joint probability distribution over the current variables.

Some embodiments are based on the realization that the Kalman filter should collectively adjust parameters defining the control policy, because the cost function 295 and the control inputs are interdependent on each other. One advantage of using the Kalman filter is that the interdependence of the control inputs is considered by means of a joint distribution of the control inputs.

Figure 8:
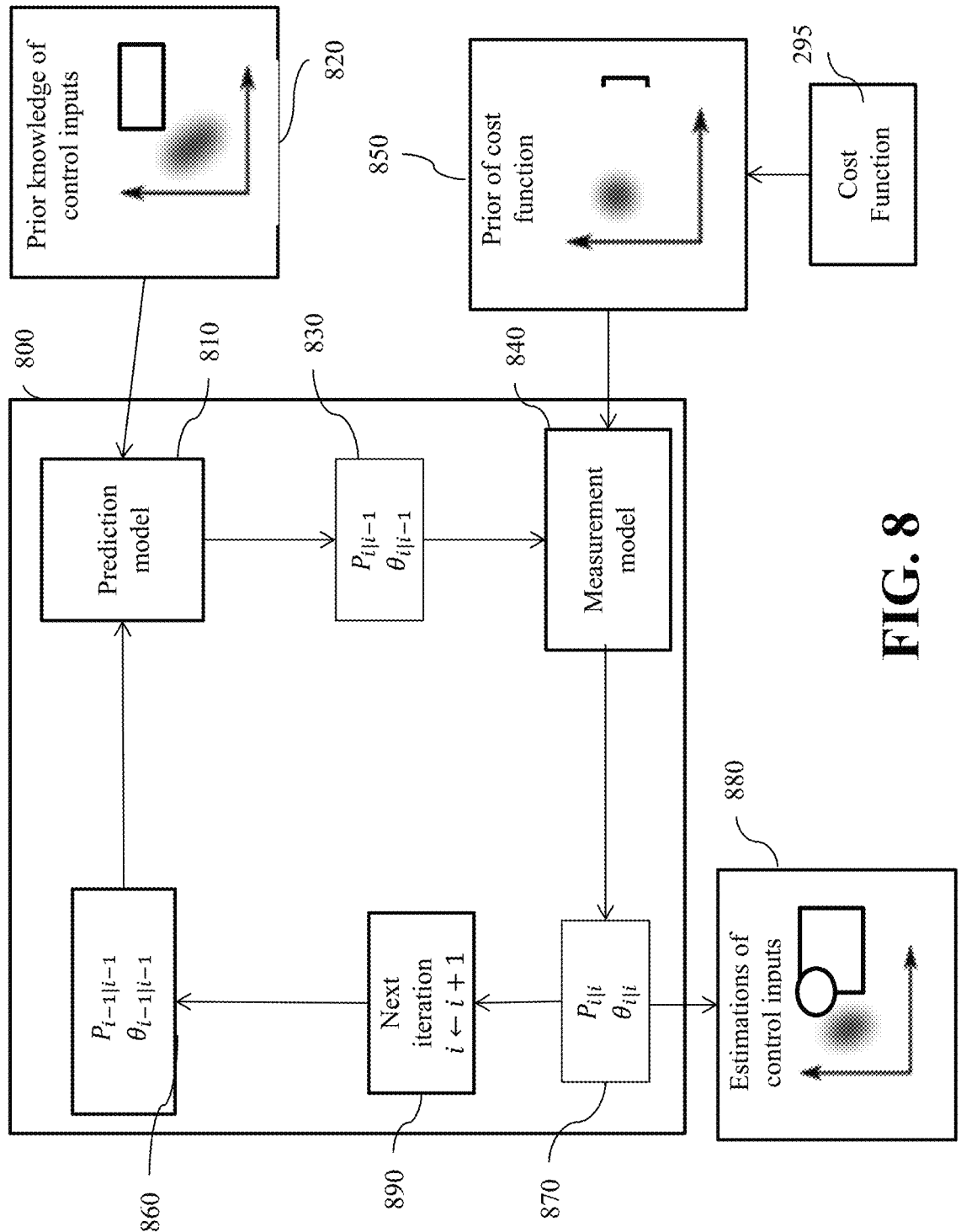
FIG. 8 illustrates an implementation of the probabilistic solver as an iterative procedure with a Kalman filter, according to some embodiments in the present disclosure.

FIG. 8 illustrates an implementation of the probabilistic solver 160 as an iterative procedure with the Kalman filter 800, according to some embodiments in the present disclosure. According to an embodiment, a state of the Kalman filter 800 is defined by the control inputs. To this end, it is an objective of the Kalman filter 800 to iteratively produce the control inputs for the different control steps. In an example embodiment, the Kalman filter 800 may iteratively produce the control inputs, using a prediction model 810 and a measurement model 840.

The prediction model 810 of the Kalman filter 800 may be used for the prediction step 270. The measurement model 840 of the Kalman filter 800 may be used as a combination of the simulation step 280 and the correction step 290. For instance, the measurement model 840 of the Kalman filter 800 may be specified by means of the cost function 295. The cost function 295 may be interpreted as having a prior distribution given by a multivariate Gaussian distribution, $$\frac{1}{\sqrt{\det(2\pi Q^{-1})}} \exp\left(-\frac{1}{2}\|h_{ref} - h(x(t), u(t))\|_Q\right), \qquad (20)$$

whose logarithm is $$-\log\sqrt{\det(2\pi Q^{-1})} - \frac{1}{2}\|h_{ref} - h(x(t), u(t))\|_Q. \qquad (21)$$

The probabilistic solver 160 is based on the observation that maximizing the logarithm of the multivariate Gaussian distribution is similar to minimizing the squared 2-norm defining the cost function 295. The multivariate Gaussian distribution may therefore define a prior distribution 850 of the cost function 295. For instance, the prior distribution may be given by a mean, $h_{ref}$, and a covariance, $Q^{-1}$, $$h(x(t),u(t)) \sim N(h_{ref}, Q^{-1}). \qquad (22)$$

In order to produce the control input in a current iteration, the prediction model 810 may be configured to predict values of the control input using a prior knowledge 820 of the control input. For instance, the prior knowledge 820 of the control input may be a measure of how quickly the control input is expected or desired to change between iterations. For example, the control input may be expected to change according to the identity model or the gradient with respect to the cost function 295 and a process noise. The process noise may be a measure of trustworthy the prediction model 810 is. The prior knowledge 820 of the control input may be a joint probability distribution (or a Gaussian distribution) over the control input. The process noise may be a joint Gaussian distribution with zero mean and a prior covariance, $P_0$. The process noise may be artificially designed.

The prediction model 810 may produce a predicted joint probability distribution 830 using the prior knowledge 820 of the control input and a joint probability distribution over the control input at the pervious iteration 860. For instance, the joint probability distribution over the control input at the pervious iteration 860 may be defined by a mean, $\theta_{i-1|i-1}$, and a variance (or a covariance), $P_{i-1|i-1}$, computed at the previous iteration (e.g., at an iteration i−1). For instance, the joint probability distribution over the control input at the pervious iteration 860 may be produced based on a joint probability distribution that was produced in a past previous iteration (e.g., at iteration i−2). The predicted joint probability distribution 830 over the control input may be defined by a predicted mean, $\theta_{i|i-1}$, and a predicted variance (or a covariance), $P_{i|i-1}$.

The predicted joint probability distribution 830 over the control input can be the PDF 220 of the prediction step 270 illustrated in FIG. 2. For instance, a predicted mean, $\theta_{i|i-1}$, and a predicted variance (or a covariance), $P_{i|i-1}$, may be computed using the prediction model 810 with the identity model, $$\theta_{i|i-1} = \theta_{i-1|i-1} \qquad (23)$$

and $$P_{i|i-1} = P_{i-1|i-1} + P_0, \qquad (24)$$

where $P_0$ is a prior covariance, which is part of the prior knowledge 820 of the control input.

Alternatively, a predicted mean, $\theta_{i|i-1}$, and a predicted variance (or a covariance), $P_{i|i-1}$, may be computed using the prediction model 810 with the gradient with respect to the cost function 295, $$\theta_{i|i-1} = \theta_{i-1|i-1} + f(\theta_{i-1|i-1}) \qquad (25)$$

with $f(\theta_{i-1|i-1})$ being the gradient with respect to the cost function 295 as in (9), and $$P_{i|i-1} = F_{i-1} P_{i-1|i-1} F_{i-1}^T + P_0. \tag{26}$$

with $$F_{i-1} = \frac{\partial f(\theta_{i-1|i-1})}{\partial \theta_{i-1|i-1}}. \tag{27}$$

It is understood that the present disclosure is not limited to the two examples of prediction models and other prediction models can be utilized as well.

Different embodiments use different implementations of the probabilistic solvers 160. Additionally or alternatively, different embodiments use different types of the Kalman filter. For example, one embodiment uses a framework of an Unscented Kalman filter. This embodiment is advantageous because the Unscented Kalman filter performs the update during its correction step without estimating a gradient. In such a manner, this embodiment can solve the optimization problem without estimating any gradients, which is beneficial for a number of dynamical devices with complex dynamics.

In addition, the unscented Kalman filter can indicate the samples of control inputs advantageous for the simulation step 280. For example, the unscented Kalman filter represents a PDF of the values of the control inputs with sigma points and uses the sigma points throughout iterations of the unscented Kalman filter to perform unscented transform. Some embodiments are based on the realization that the sigma points can be used as sampled control inputs to simulate its operation. In such a manner, the evaluation of the operation of the device is integrated into probabilistic framework of the unscented Kalman filter.

The measurement model 840 of the Kalman filter 800 may use the predicted joint probability distribution 830 in order to determine the simulation trials as illustrated in FIG. 4. Some embodiments use the unscented Kalman filter implementation in order to determine the simulation trials. The unscented Kalman filter computes sigma points representing the predicted joint probability distribution 830. Hence, the sigma points define an alternative definition of the predicted joint probability distribution 830. Each of the sigma points characterizes one simulation trial in the simulation step 280. Each of the sigma points, $\theta_i^{sp,j}$, represents a realization of the control input, $$u_i^{sp,j}(t) = \phi(\theta_i^{sp,j}, t). \tag{28}$$

Therefore, the sigma points, $\theta_i^{sp,j}$, can be simulated using the simulation model 170, which results in a simulated sigma point-based state trajectory $x_i^{sp,j}(t)$.

Given the simulated sigma point-based state trajectory, the measurement model 840 can use the cost function 295 in order to evaluate a simulated performance for each of the sigma points, $$h_i^{sp,j} = h(x_i^{sp,j}(t), u_i^{sp,j}(t)). \tag{29}$$

Weights of the unscented Kalman filter may be chosen differently. For example, the weights may be chosen to have equal weight, $$w^{a,j} = w^{c,j} = \frac{1-w^0}{2n_\theta}, \quad w^{a,0} = w^{c,0} = w^0 = 0. \tag{30}$$

The sigma points may be computed using a covariance matrix and a Choletsky decomposition, $$\theta_i^{sp,0} = \theta_{i|i-1} \tag{31}$$

$$\theta_i^{sp,0} = \theta_{i|i-1} + \sqrt{\frac{n_\theta}{1-w^0}} [A_i]^j \quad j=1, \ldots, n_\theta$$

$$\theta_i^{sp,0} = \theta_{i|i-1} - \sqrt{\frac{n_\theta}{1-w^0}} [A_i]^j \quad j=n_\theta+1, \ldots, 2n_\theta.$$

where $[A_i]^j$ is j-th column of the squared matrix $A_i$ with $P_{i|i-1} = A_i A_i^T$.

The unscented Kalman filter is advantageous because the covariance matrix and the estimate of the control input define both the simulation trials to be evaluated and how to update the control input using the results of the simulation trials.

The measurement model 840 can use the simulated performance for each of the sigma points in order to execute the correction step 290. For example, the measurement model 840 may compute a weighted average of the sigma points, $$\hat{\theta}_i = \sum_{j=0}^{2n_\theta} w^{a,j} \theta_i^{sp,j}, \tag{32}$$

and a weighted average of the simulated performances of the sigma points, $$\hat{h}_i = \sum_{j=0}^{2n_\theta} w^{a,j} h_i^{sp,j}. \tag{33}$$

Some embodiments use the sigma points and the simulated performances of the sigma points in order to iteratively update the control input.

For example, the measurement model 840 may update the parameters/control input defining the control policy, $$\theta_{i|i} = \theta_{i|i-1} + K_i(h_{ref} - \hat{h}_i), \tag{34}$$

and the covariance matrix of the parameters defining the control policy, $$P_{i|i} = P_{i|i-1} - K_i S_i K_i^T, \tag{35}$$

using a Kalman gain, $K_i$, $$K_i = C_i S_i^{-1}, \tag{36}$$

and an innovation covariance matrix, $$S_i = Q^{-1} + \sum_{j=0}^{2n_\theta} w^{c,j} (h_i^{sp,j} - \hat{h}_i)(h_i^{sp,j} - \hat{h}_i)^T, \tag{37}$$

and a cross-covariance matrix, $$C_i = \sum_{j=0}^{2n_\theta} w^{c,j} (\theta_i^{sp,j} - \hat{\theta}_i)(h_i^{sp,j} - \hat{h}_i)^T. \tag{38}$$

It is understood that the presented implementation represents an example implementation. Indeed, other implementation such as a different choice of weights, a different computational of the sigma points, or different a different prediction model may be chosen similarly.

The correction step 290 of the measurement model 840 may then output an updated mean, $\theta_{i|i}$, and an updated covariance, $P_{i|i}$, of the control input 870. The updated joint distribution of the control input 880 may then be used in order determine the input signal 180 to the device 110 if the termination condition as illustrated in FIG. 7 is satisfied. If the termination condition is not satisfied, then a next iteration 890 is executed.

Some embodiments are based on the realization that an additional advantage of having the Kalman filter parameterized on the control input is that the Kalman filter can test several samples from the PDF 220 of the predicted values to speed up the convergence. Testing multiple samples results in multiple simulations. However, the testing and simulation can be performed concurrently using multiple parallel processors. In addition, different samples can be tested with different Kalman filters having different measurement noises.

FIG. 9 shows an example list of objectives of the cost function 295, according to some embodiments in the present disclosure. The cost function can be any combination of elements in the list. For example, the cost function can include a cost for the deviation of any number of states from target states 910, $h_{ref}=x_{ref}$ and $h(x(t), u(t))=x(t)$; a cost for the deviation of any number of inputs from target inputs 915, $h_{ref}=u_{ref}$ and $h(x(t), u(t))=u(t)$.

Further, the cost function 295 may be a cost, $c_1$, for a state exceeding a certain range of operation 920, $h_{ref}=0$ and $$h(x(t), u(t)) = \begin{cases} 0 & \text{if } x \in X \\ c_1 & \text{else} \end{cases};$$

a cost, $c_2$, for an input exceeding a certain range of operation 925, $h_{ref}=0$ and $$h(x(t), u(t)) = \begin{cases} 0 & \text{if } u \in U \\ c_2 & \text{else} \end{cases};$$

a cost, $c_3$, to penalize oscillations of one or more states 930, e.g., $h_{ref}=0, h(x(t),u(t))=c_3\cdot\text{\#sign changes}(x(t))$ within 3 seconds;

a cost, $c_4$, to penalize oscillations of one or more states 935, e.g., $h_{ref}=0, h(x(t),u(t))=c_4\cdot\text{\#sign changes}(u(t))$ within 4 seconds;

a cost, $c_5$, if the reference/target state is overshoot by a certain value 940, e.g., $$h_{ref} = 0, h(x(t), u(t)) = \begin{cases} 0 & \text{if } x(t) \leq 1.1(x_{ref} - x(t)) \\ c_5 & \text{else} \end{cases};$$

a cost, $c_6$, if the input exceeds a certain region of operation for a certain time 945, e.g., $$h_{ref} = 0, h(x(t), u(t)) = \begin{cases} c_6 & \text{if } u \notin U \text{ for more than 1 seconds} \\ 0 & \text{else} \end{cases};$$

a cost if states change between time steps 950, e.g., $h_{ref}=0, h(x(t),u(t))=\|x(t+t_1)-x(t)\|_2$;

a cost if inputs change between time steps 955, e.g., $h_{ref}=0, h(x(t),u(t))=\|u(t+t_1)-u(t)\|_2$;

a cost, $c_7$, if states change quicker than a certain value between time steps 960, e.g., $$h_{ref} = 0, h(x(t), u(t)) = \begin{cases} 0 & \text{if } \|x(t+t_1) - x(t)\|_2 \leq \bar{x} \\ c_7 & \text{else} \end{cases};$$

a cost, $c_8$, if inputs change quicker than a certain value between time steps 965, e.g., $$h_{ref} = 0, h(x(t), u(t)) = \begin{cases} 0 & \text{if } \|u(t+t_1) - u(t)\|_2 \leq \bar{u} \\ c_8 & \text{else} \end{cases}.$$

Additionally or alternatively, it is possible to select an objective to include a cost for certain control inputs themselves (rather than the states or inputs), e.g., $h_{ref}=\theta_{nom}, h(x(t),u(t))=\theta_i$, where $\theta_{nom}$ defines nominal values for any or all control parameters.

Figure 10:
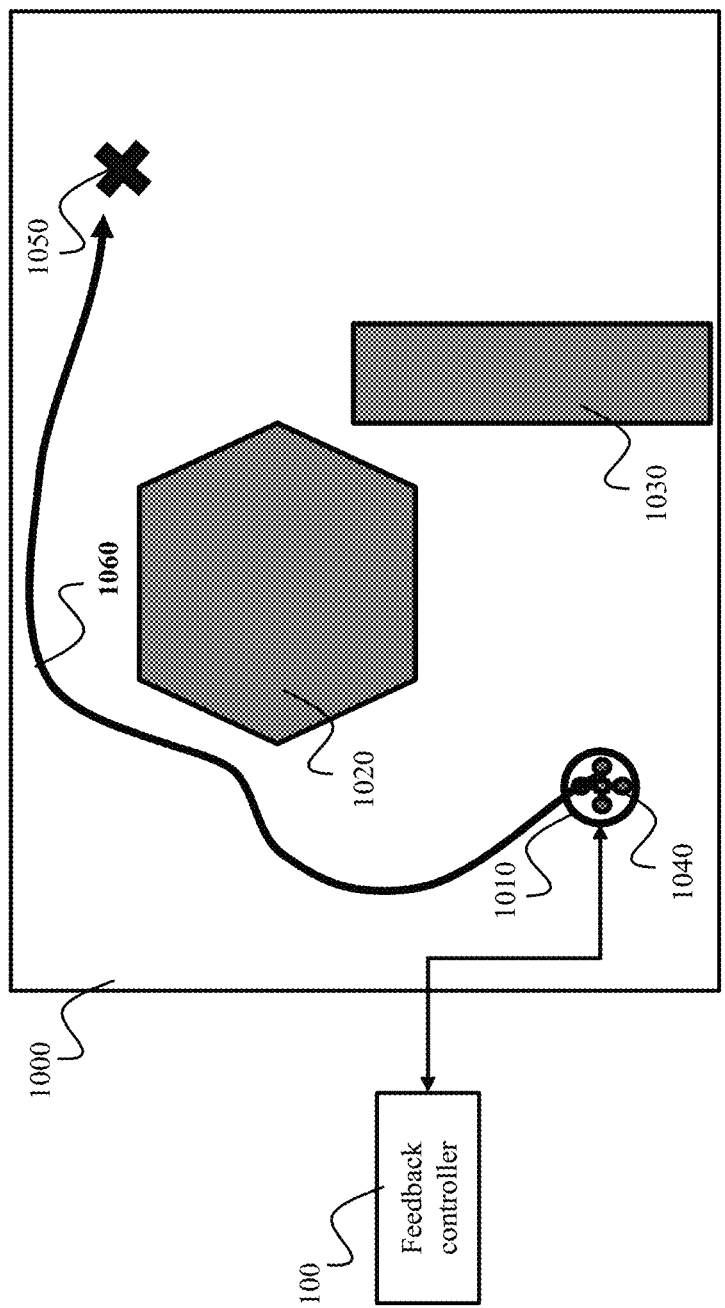
FIG. 10 illustrates controlling of the device by the feedback controller, in an environment, according to some embodiments of the present disclosure.

FIG. 10 illustrates controlling of the device, such as a robot 1010, in an environment 1000, according to some embodiments of the present disclosure. The robot 1010 is communicatively coupled to the feedback controller 100. The environment 1000 may be an autonomous factory 1000 including obstacles 1020 and 1030. The robot 1010 is required to perform a task of traversing a path 1060 to reach a target position 1050. The path 1060 connects an initial position 1040 and the target position 1050 of the robot 1010 in the environment 1000.

In an embodiment, the feedback controller 100 controls the robot 1010 from the initial position 1040 to the target position 1050 such that the robot 1010 deviates minimum from the path 1060. For example, the feedback controller 100 collects a measurement indicative of a state of the robot 1010, e.g., a current position of the robot 1010. Further, the feedback controller 100 executes, recursively until the termination condition is met, the probabilistic solver 160 to produce a control input that maintains the position of the robot 1010 along the path 1060. The feedback controller 100 further controls the robot 1010, based on the produced control input.

Additionally, in some embodiments, the feedback controller 100 may be used to control a crane maneuvering a load. For example, the feedback controller 100 may minimize oscillations of the crane's load with respect to a reference path, while maneuvering the load.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A feedback controller for controlling an operation of a device at different control steps based on a feedback signal including measurements indicative of a state of the device at the different control steps, the feedback controller comprising: at least one processor; and memory having instructions stored thereon that, when executed by the at least one processor, causes the feedback controller, for a control step of the different control steps, to:
    collect a measurement indicative of the state of the device at the control step;
    execute, recursively until a termination condition is met, a probabilistic solver parameterized on a control input to an actuator operating the device to produce the control input for the control step, wherein, during each of the executions, the probabilistic solver is configured to
        estimate a probabilistic distribution function (PDF) of predicted values of the control input from a PDF of values of the control input using a prediction model;
        evaluate a cost function of an optimal control problem for controlling the device based on a simulation of the operation of the device with the measurement and a value of the control input sampled from the PDF of the predicted values of the control input to produce a performance metric of the operation of the device; and
        estimate a PDF of simulated values connected to the control input based on a measurement model connecting the performance metric of the operation of the device with the control input; and
        correct the PDF of the predicted values of the control input based on the PDF of the simulated values connected to the control input to produce the PDF of the values of the control input; and
    control the actuator operating the device using at least a mean of the PDF of the values of the control input.

2. The feedback controller of claim 1, wherein the prediction model is an identity model.

3. The feedback controller of claim 1, wherein the prediction model is given by a gradient of the cost function with respect to the control input.

4. The feedback controller of claim 1, wherein, for each iteration of iterations performed for each of the control steps, the probabilistic solver is further configured to evaluate the cost function for multiple samples defining simulation trials of the PDF of the predicted values.

5. The feedback controller of claim 4, wherein to produce the PDF of the simulated values connected to the control input from multiple performance metrics, the probabilistic solver is further configured to determine a weighted combination of evaluations of the multiple samples of the PDF of the predicted values.

6. The feedback controller of claim 4, wherein the cost function for the multiple samples of the PDF of the predicted values is evaluated in parallel using multiple processors.

7. The controller of claim 1, wherein the termination condition is based on a similarity metric between the PDF of values of the control input and a PDF of the values of the control input at a previous iteration.

8. The feedback controller of claim 1, wherein the probabilistic solver is a Kalman filter.

9. The feedback controller of claim 1, wherein the probabilistic solver is an unscented Kalman filter performing a gradient-free correction of the predicted values of the control input.

10. The feedback controller of claim 9, wherein to update the PDF of the predicted values using the gradient-free correction, the unscented Kalman filter is configured to produce the PDF of the simulated values connected to the control input using evaluations of the cost function.

11. The feedback controller of claim 9, wherein the unscented Kalman filter evaluates the cost function for multiple sigma points of the PDF of the predicted values.

12. The feedback controller of claim 11, wherein, to determine the sigma points, the unscented Kalman filter is configured to generate the sigma points based on a predicted mean of the PDF of the predicted values and a covariance matrix of the PDF of the predicted values.

13. The feedback controller of claim 12, wherein the sigma points are determined based on a Cholesky decomposition.

14. A method for controlling an operation of a device at different control steps based on a feedback signal including measurements indicative of a state of the device at the different control steps, the method comprising:
    collecting a measurement indicative of the state of the device at a control step of the different control steps;
    executing, recursively until a termination condition is met, a probabilistic solver parameterized on a control input to an actuator operating the device to produce the control input for the control step, wherein, during each of the executions, the probabilistic solver is configured to
        estimate a probabilistic distribution function (PDF) of predicted values of the control input from a PDF of values of the control input using a prediction model;

evaluate a cost function of an optimal control problem for controlling the device based on a simulation of the operation of the device with the measurement and a value of the control input sampled from the PDF of the predicted values of the control input to produce a performance metric of the operation of the device; and estimate a PDF of simulated values connected to the control input based on a measurement model connecting the performance metric of the operation of the device with the control input; and correct the PDF of the predicted values of the control input based on the PDF of the simulated values connected to the control input to produce the PDF of the values of the control input; and controlling the actuator operating the device using at least a mean of the PDF of the values of the control input.

15. The method of claim 14, wherein the prediction model is an identity model.

16. The method of claim 14, wherein the prediction model is given by a gradient of the cost function with respect to the control input.

17. The method of claim 14, wherein, for each iteration of iterations performed for each of the control steps, the probabilistic solver is further configured to evaluate the cost function for multiple samples defining simulation trials of the PDF of the predicted values.

18. The method of claim 17, wherein to produce the PDF of the simulated values connected to the control input from multiple performance metrics, the probabilistic solver is further configured to determine a weighted combination of evaluations of the multiple samples of the PDF of the predicted values.

19. The method of claim 14, wherein the termination condition is based on a similarity metric between the PDF of the values of the control input and a PDF of values of the control input at a previous iteration.

20. A non-transitory computer-readable storage medium embodied thereon a program executable by a processor for performing a method for controlling an operation of a device at different control steps based on a feedback signal including measurements indicative of a state of the device at the different control steps, the method comprising:

collecting a measurement indicative of the state of the device at a control step of the different control steps;

executing, recursively until a termination condition is met, a probabilistic solver parameterized on a control input to an actuator operating the device to produce the control input for the control step, wherein, during each of the executions, the probabilistic solver is configured to estimate a probabilistic distribution function (PDF) of predicted values of the control input from a PDF of values of the control input using a prediction model;

evaluate a cost function of an optimal control problem for controlling the device based on a simulation of the operation of the device with the measurement and a value of the control input sampled from the PDF of the predicted values of the control input to produce a performance metric of the operation of the device; and estimate a PDF of simulated values connected to the control input based on a measurement model connecting the performance metric of the operation of the device with the control input; and correct the PDF of the predicted values of the control input based on the PDF of the simulated values connected to the control input to produce the PDF of the values of the control input; and controlling the actuator operating the device using at least a mean of the PDF of the values of the control input.

* * * * *